United States Patent [19]

Matsushima et al.

[11] Patent Number: 5,137,055
[45] Date of Patent: Aug. 11, 1992

[54] STOP VALVE

[75] Inventors: Tetsuhiko Matsushima; Katsurou Fujimoto; Hiroyuki Tsuchiya, all of Shizuoka, Japan

[73] Assignee: Yazaki Corporation, Japan

[21] Appl. No.: 820,226

[22] Filed: Jan. 14, 1992

[51] Int. Cl.⁵ ............................................ F16K 31/08
[52] U.S. Cl. .............................. 137/630.14; 251/30.04
[58] Field of Search ...................... 137/630.14, 630.15; 251/30.03, 30.04

[56] References Cited

U.S. PATENT DOCUMENTS 3,154,285 10/1964 Houle ............................. 251/30.04
3,994,318 11/1976 Ishigaki ......................... 137/630.14

FOREIGN PATENT DOCUMENTS 61-290281 12/1986 Japan .
64-781 1/1989 Japan .
2-102082 8/1990 Japan .

Primary Examiner—Robert G. Nilson
Attorney, Agent, or Firm—Wigman & Cohen

[57] ABSTRACT

A stop valve for closing a nozzle in a fluid passage comprising: a valve shaft movable in the axial direction relative to the nozzle; a solenoid attached to an end of the shaft for moving the shaft in the axial direction; an auxiliary valve consisting of a secondary valve body disposed around the shaft and a supporting part extending in the axial direction of the valve shaft and engaged with a part of the valve shaft through a spring for carrying the secondary valve body at one end and a spring-engaging portion at the other end and for moving together with the valve shaft in the axial direction; a main valve body disposed around the valve shaft between the spring-engaging portion and the secondary valve body and formed with a central aperture to be opened or closed by the secondary valve body, the main valve body being pressed against the secondary valve body by a contracted spring disposed between the spring-engaging portion of the supporting part of the auxiliary valve and the main valve body so that the main valve body can move together with the secondary valve body in the axial direction of the valve body to close or open the nozzle; and resilient means energized to adequately press the secondary valve body in the axial direction away from the nozzle when the main valve body is in the closed position.

7 Claims, 5 Drawing Sheets

STOP VALVE

BACKGROUND OF THE INVENTION

This invention relates to a stop valve for shutting off a flow of fluid, and in particular to a stop valve having a main valve body formed with a central aperture and a secondary valve body to close or open the aperture.

DESCRIPTION OF THE PRIOR ART

In the prior art such as Japanese Patents 86/290281 (A) and 89/781 (U), a stop valve for opening a large nozzle by a small force is disclosed. The stop valve has a valve shaft provided at one end with a main valve body for closing or opening the nozzle in the fluid passage. The main valve body is formed with a central aperture to be opened or closed by a secondary valve body slidably supported by one end of the valve shaft.

The valve shaft is axially activated relative to the nozzle by a solenoid secured to the other end of the valve shaft so that the main valve body can close the nozzle.

In addition, a stop valve using a solenoid is disclosed in Japanese Patent 90/102082 (U). In this valve, the valve shaft is secured to a movable steel core in the solenoid.

There are some drawbacks to be overcome in the stop valves of the above Japanese Patents. For example, the main valve of the stop valve disclosed in the above Japanese patent 86/290281 (A) tends to be inclined to the valve shaft, that is, is not parallel to the nozzle, so that a good airtight condition is not maintained. Considerable time and effort is required to attach the stop valve of the above Japanese Patent 90/102082 (U) to the fluid passage since the valve is formed integrally. In all these Japanese Patents, securing the valve to the fluid passage is very troublesome.

SUMMARY OF THE INVENTION

It is therefore the primary object of the present invention to provide an improved stop valve with enhanced airtightness which can be opened easily by a small force.

It is a further object of the present invention to provide a stop valve which can be easily manufactured and secured to the fluid passage.

It is a further object of the present invention to provide an improved stop valve which can be kept open when so desired, regardless of a flow which tends to close the valve.

The stop valve of the present invention includes a valve shaft axially actuated relative to the nozzle in a fluid passage by a solenoid attached to one end of the valve shaft. The valve shaft supports around a part of the shaft a main valve body and an auxiliary valve provided with a secondary valve body. The main valve body closes or opens the nozzle and however is formed with a central aperture to be closed or opened by the secondary valve body. A supporting part of the auxiliary valve is slidably mounted through a first spring on the part of the valve shaft. The supporting part extends in the axial direction of the valve shaft and supports at a proximal end the secondary valve body and at a distal end a spring-engaging portion extending for a second spring in a direction perpendicular to the valve shaft. The main valve is disposed between the supporting part and the secondary valve body and is pressed against the secondary valve body by the second spring which is provided between the spring-engaging portion and the secondary valve and which is contracted in advance. Therefore, the secondary valve body can close the central aperture of the main valve body, and the valve shaft can support both the secondary and main valve bodies.

The supporting part is preferably equipped with a slider such as a hollow cylinder to move along the valve shaft to maintain the secondary valve body horizontal to the nozzle and equipped with ribs to keep the main valve in position.

The secondary valve body engages a resilient member such as a coil spring secured to the fluid passage so that the secondary valve body can be energized with a tendency to return to the original position when the valve shaft is pressed towards the nozzle by a movable steel core of the solenoid.

In order to open the nozzle, only the secondary valve, which has a small area subject to fluid pressure, is opened. When the solenoid is energized to withdraw the movable steel core, the secondary valve is slightly separated from the main valve body by the resilient member against the fluid pressure on the secondary valve body and the force of the first spring which pushes the secondary valve against the main valve, while the main valve body remains closed since it is subjected to a large force. Then, the fluid passes through the central aperture of the main valve, and the pressure differential between the outside and the inside of the nozzle becomes nearly zero. Therefore, the main valve body is opened since it is moved together with the secondary valve body by means of the second spring which presses the main valve against the secondary valve. Thus, only the small force by the solenoid is required to open the stop valve of the present invention.

The resilient member is preferably secured to the fluid passage through an engaging block so that assemblies of the main and secondary valve bodies, the supporting part and the resilient member can be easily positioned in the fluid passage.

DESCRIPTION OF THE PREFERRED EMBODIMENTS

The invention will now be explained in detail through embodiments with reference to the accompanying drawings.

Figure 1:
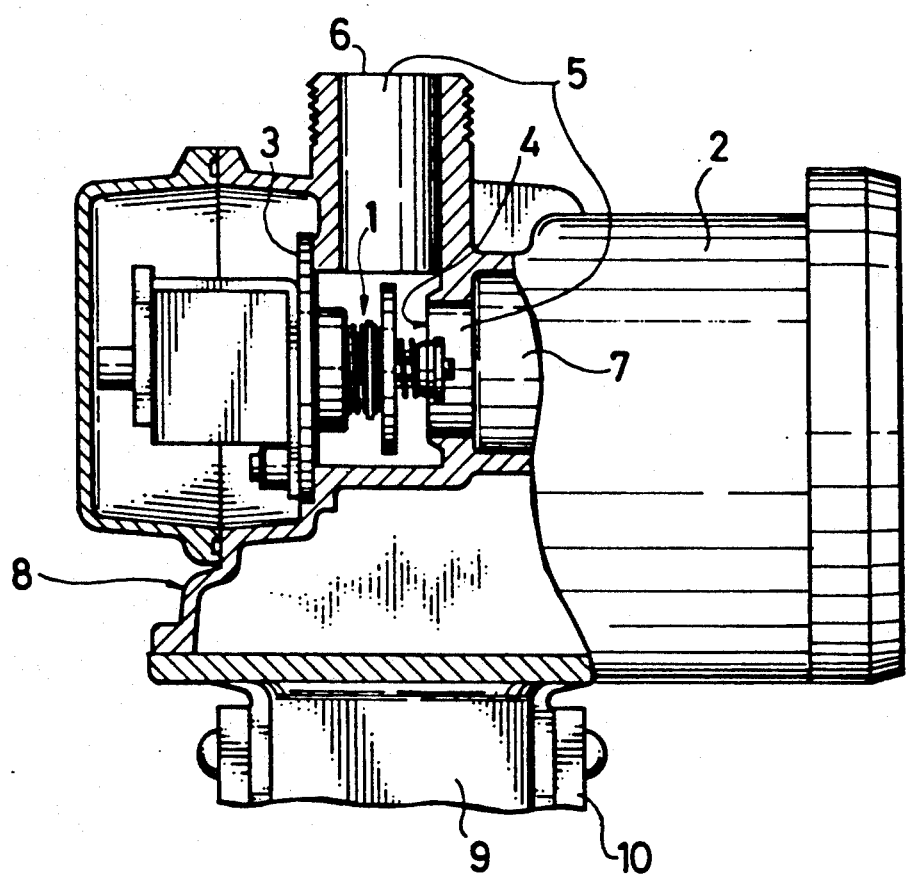
FIG. 1 is a partial sectional view showing a stop valve of the present invention mounted on a gas meter.

FIG. 1 shows a stop valve unit 1 of this invention attached to a gas meter 2 through a wall 3. The stop valve 1 opens or closes a nozzle 4 in a fluid passage 5 in the gas meter 2. The gas flows from an inlet port 6 to the nozzle 4 and then to a chamber 7 outside the nozzle 4 in the passage 5 in the upper part 8 of the meter 2, then further flows into a chamber 9 which is connected to the chamber 7 and disposed in a lower part 10 of the gas meter 2. A metering device (not shown) is provided in the chamber 9. The metering device and the stop valve unit 1 are driven by a small dry battery (not shown) such as a lithium battery mounted on the meter 2. They are therefore operable any time even if no other electric power is supplied to the meter.

Figure 2:
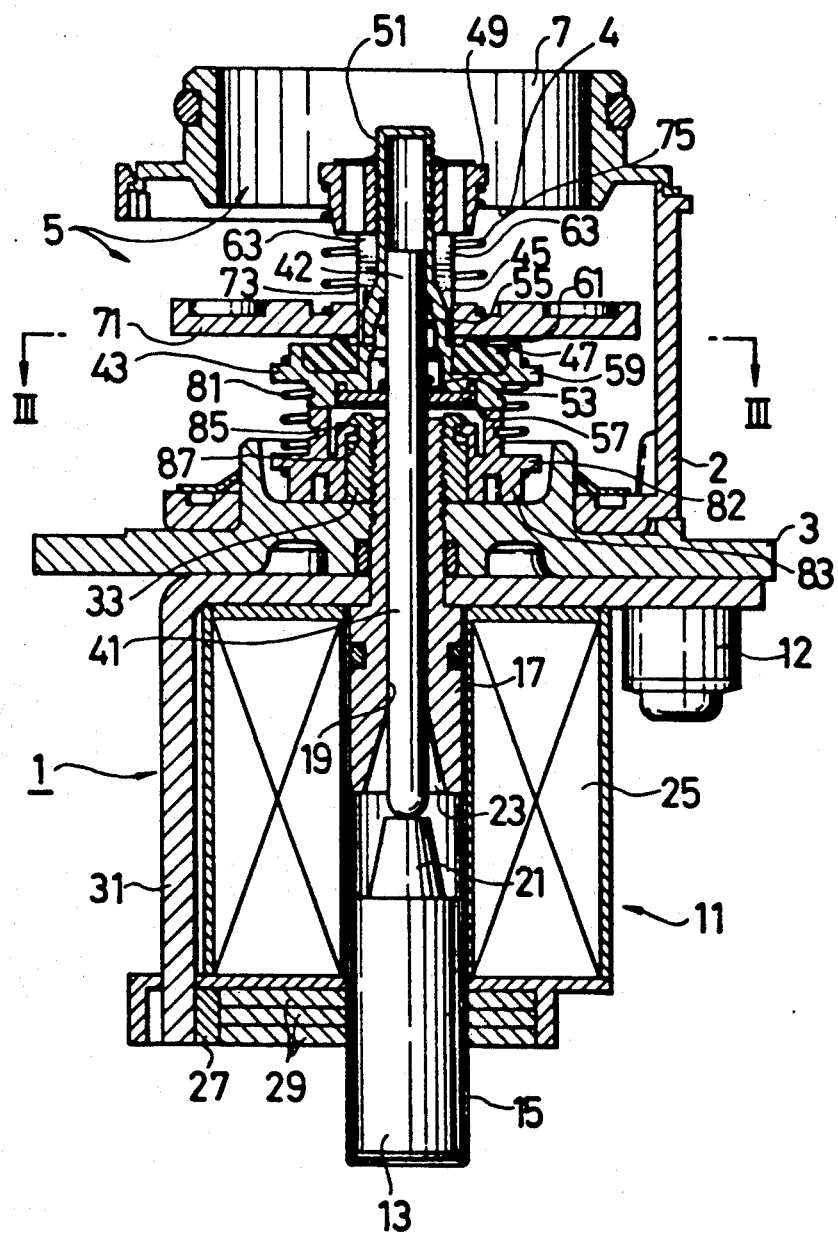
FIG. 2 is an enlarged longitudinal sectional view of the stop valve of FIG. 1, showing the stop valve in the open position to allow flow.
Figure 3:
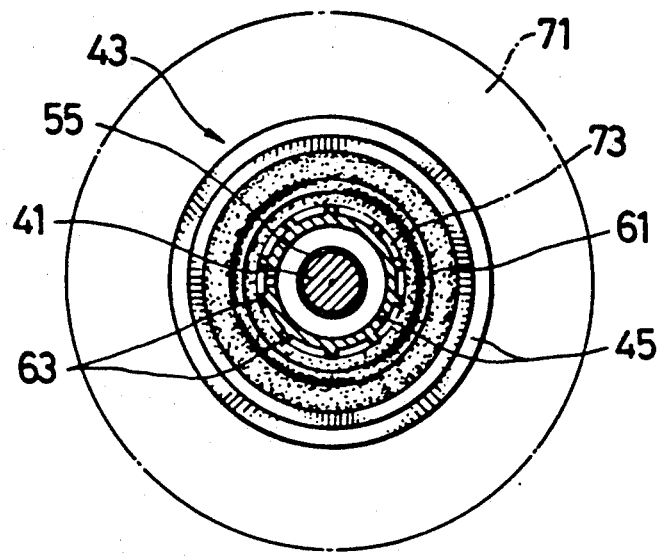
FIG. 3 is a horizontal sectional view taken along line III—III in FIG. 2.

FIG. 2 shows the stop valve unit 1 with a solenois 11 for moving a valve shaft 41 axially. A movable steel core 13 is slidably disposed in a lower part of a brass tube 15 of the solenoid 11, and a steel block 17 with a through-hole 19 is securely positioned above the movable steel core 13 in an upper part of the brass tube 15. The fixed steel block 17 is detached from the movable steel core. The movable steel core 16 has a tapered tip 21, while the steel block 17 has a conical hole 23 for accommodating the tapered tip 21 of the movable steel core 13. A coil 25 is disposed around the tube 15.

A permanent magnet 27 and intermediate steel plates 29 connected to the magnet 27 are provided on the bottom of the solenoid 11 which is also provided with an L-shaped steel angle 31 connecting the fixed steel block 17 and the magnet 27. The tube 15 penetrates the intermediate steel plates 29.

The solenoid 11 is secured by a screw 12 to the wall 3 of the gas meter 2. In addition, a threated end portion 18 of the fixed steel block 17 is inserted into the fluid passage 5 and is there engaged and secured by a nut member 33.

The valve shaft 41 is slidably disposed in the hole 19 of the fixed steel block 17. A proximal end of the valve shaft 41 contacts the tip 21 of the movable steel core 21.

In FIGS. 2-5, an auxiliary valve 43 engages with a part, or free end 42 of the valve shaft 41. The auxiliary valve 43 includes a supporting part 45 in the shape of a top hat, a secondary valve body 47 in the shape of an annular disk, and a spring-engaging portion 49. The hat-like supporting part 45 has a hollow cylindrical portion 51 for slidably engaging the free ▸ d 42 of the shaft 41. A small annular plate 53 is secured around a lower part of the free end 42. A coil spring 55 is disposed between the supporting part 45 and the annular plate 53 so as to connect the auxiliary valve 43 and the valve shaft 42. A disk 57 is secured to the bottom of a rim 59 of the hat-like supporting part 45 so that the disk 57 is positioned under the small annular plate 53 in FIG. 2. The supporting part 45 supports the secondary valve body 47 on the rim 59.

The secondary valve body 47 is perpendicular to the cylindrical portion 51 and is always maintained perpendicular to the valve shaft 42, or parallel to the nozzle 4 since the cylindrical portion 51 is designed to fit tightly on the free end 42 of the valve shaft 41. The secondary valve body 47 has an annular projection or valve seat 61.

The cylindrical portion 51 of the supporting part 45 of the auxiliary valve 43 is threaded, and the supporting part is formed with ribs 63 extending in the axial direction of the valve shaft.

A main valve body 71 with a central aperture 73 is mounted on the secondary valve body 47 while the cylindrical portion 51 is inserted into the central aperture 73. The main valve body 71 can slide along ribs 63 and is maintained parallel to the nozzle 4 by means of the ribs 63. A second coil spring 75 is disposed behind the main valve body 71. The spring engaging portion 49, which is threaded, is screwed onto the threaded cylindrical portion 51 causing the second coil spring 75 to contract. Therefore, the main valve body 71 is pressed against the valve seat 61 of the secodary valve body 47 by the contracted coil spring 75. As a result, the central aperture 73 of the main valve body 71 is closed tightly by the secondary valve body 47.

It is preferable that the first coil spring be contracted in advance to enhance the airtightness between the main and secondary valve bodies and to reduce displacement of the supporting part 45 due to the action of the second contracted spring 75 through the spring-engaging portion 51.

Figure 5:
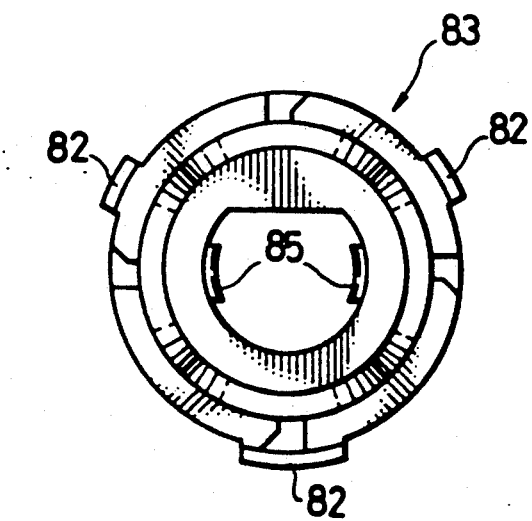
FIG. 5 is a plan view of an engaging block of the stop valve.

The rim 59 of the auxiliary valve 43 is engaged by an end of the third coil spring 81 which acts as resilient means. The coil spring 81 engages a plurality of outer projections 82 of an engaging block 83 as shown in FIGS. 2 and 5. The engaging block 83 is slid along the nut member 33, and inner projections 85 of the engaging block 83 are received in a circumferential recess 87 formed in the nut member 33. Therefore, the engaging block 83 is secured in the fluid passage.

The upper unit of the stop valve including the valve shaft 41, first, second and third coil springs 61, 75 and 81, auxiliary valve 43, main valve body 71 and engaging block 83 may be factory assembled, while the lower unit or a solenoid 11 of the stop valve including the movable steel core 13 and the fixed steel block 17 may also be factory assembled in another location. After the lower unit is secured to the fluid passage 5 by the screw 12 and nut member 33, the upper unit is easily attached to the lower unit by inserting the valve shaft 41 into the fixed steel block 17 and sliding the engaging block 83 along the nut member 33.

Figure 4:
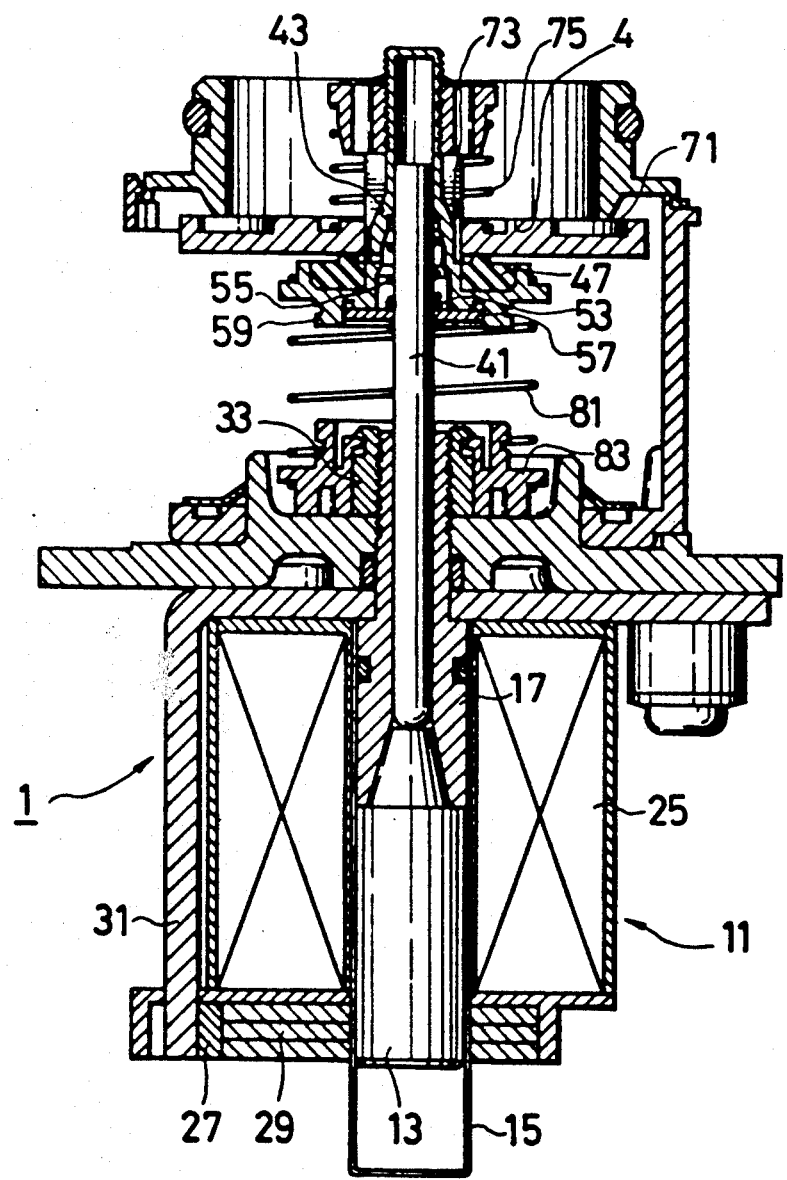
FIG. 4 is an enlarged longitudinal sectional view of the stop valve of FIG. 1, showing the valve body is in the closed position to stop flow.

Now, switching of the stop valve 1 from the open position shown in FIG. 2 to the closed position in FIG. 4 and vice versa is explained.

The coil 25 is deenergized, and the movable steel core 13 is in its deenergized position as shown in FIG. 2. If an alarm signal is received by the solenoid 11, the coil 25 or solenoid 11 is energized. As a result, the movable steel core plunger 13 is drawn to the fixed steel block 17 causing the valve shaft 41, which contacts the tip 21 of the plunger 13, to move towards the nozzle 4 against the force of the third coil spring 81. Therefore, the main valve body 71 is pressed against the nozzle 4 through the small annular plate 53, first coil spring 55 and auxiliary valve, causing the first coil spring 55 to contract. Thus, airtightness is maintained between the nozzle and the main valve body.

At this stage, the coil 25 is deenergized. However, the tip 21 of the plunger 13 is still drawn to the conical hole 23 of the fixed steel block 17 since a loop of the magnetic force of the permanent magnet 27 is formed along the magnet 27, intermediate steel plates 22, movable steel core 13, fixed steel block 17 and L-shaped steel angle 31. The magnetic force is sufficiently strong to oppose the resilient force of the third coil spring 81.

When the solenoid receives a signal to open the nozzle 4, the coil 25 is energized by a current which flows in the opposite direction. As a result, the plunger 13 is withdrawn by the force of the energized solenoid and the resilient force of the third coil spring 81 against the force of the permanent magnet 27, the pressure on the auxiliary valve 43 and the first and second coil springs. Therefore, the small annular plate 53 is pressed against the disk 57 secured to the bottom of the rim 59 of the auxiliary valve 43, and the auxiliary valve 43 or secondary valve body 47 slightly separated from the main valve body 71 causing the first coil spring to contract. Thus, only the central aperture of the maind valve body 71 is opened, and at that moment the nozzle 4 is still closed by the main valve body 71 since the main valve body which has a larger area than the secondary valve body is subjected to larger force due to the fluid pressure.

Then, gas fluid passes through the central aperture, and the pressure behind the main valve body 71 in the closed position becomes nearly equal to that in front of the main valve body. Hence, the upper unit of the stop valve returns to the prior or open position due to the resilient force of the third coil spring 81.

Figure 6:
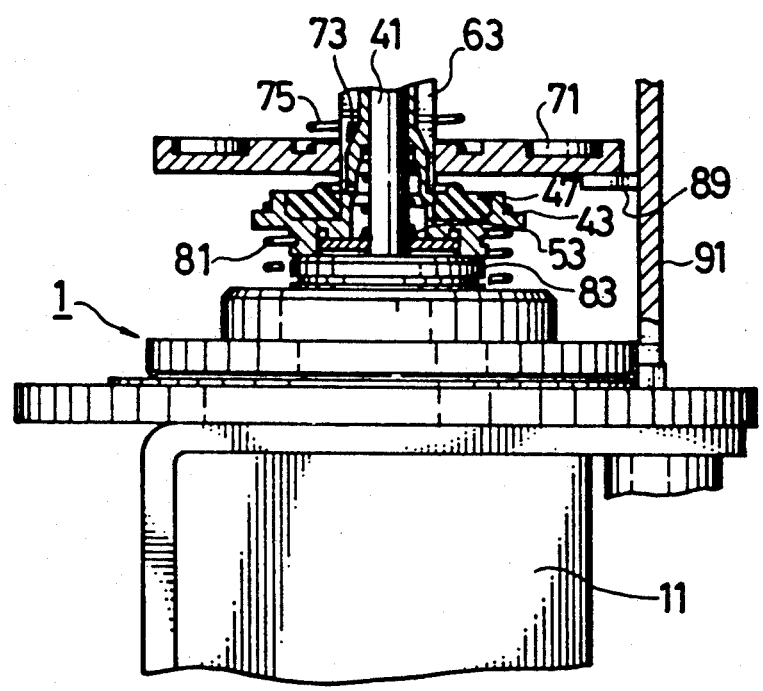
FIG. 6 is a partial enlarged longitudinal section showing a modified example of the stop valve provided with a stopper for detaching the main valve body from a secondary valve body.

In FIG. 6, the stop valve 1 described above has a stopper 89. The stopper 89 is secured to a wall 91 of the fluid passage. Here, the action of the stopper 89 is explained. When the valve is opened and the valve bodies are moved towards the open position, only the main valve body 71 comes into contact with the stopper and is slid back a little towards the nozzle along the ribs 63. Therefore, the main valve body is detached from the secondary valve body 47 to open the central aperture of the main valve body.

If the central aperture is closed, a gas flow which passes through from the front of the large valve bodies to the rear tends to cause a negative pressure behind the valve bodies. This activates the stop valve to close the nozzle against the resilient force of the third coil spring 81.

When the main valve body 71 is detached from the secondary valve body to open the central aperture 73 of the main valve body as shown in FIG. 6, the flow passes through the aperture, and therefore the negative pressure is not induced behing the valve bodies. Hence, the stop valve is maintained in the open position when so required. Although the stopper 89 is attached to the wall 91 in the drawing, the stopper may however be attached to the stop valve, for example, to the engaging block 83, the solenoid 11, or any other appropriate portion of the stop valve.

We claim:

1. A stop valve for closing a nozzle in a fluid passage comprising:
   a valve shaft movable in an axial direction relative to the nozzle, at least a part of the valve shaft being disposed in the fluid passage;
   a solenoid attached to an end of the valve shaft for moving the valve shaft in the axial direction;
   an auxiliary valve including a secondary valve body disposed around the valve shaft and a supporting part extending in the axial direction of the valve shaft for supporting the secondary valve body at a proximal end and a springing engaging portion at a distal end, the spring engaging portion being separated from the secondary valve body and opposing the secondary valve body, the supporting part being slidably engaged with the part of the valve shaft through a first spring for moving together with the valve shaft in the axial direction;
   a main valve body disposed around the valve shaft between the spring engaging portion and the secondary valve body of th auxiliary valve and formed with a central aperture to be opened or closed by the secondary valve body, the main valve body being pressed against the secondary valve body by a second contracted spring disposed between the spring engaging portion of the secondary valve body and the main valve body so as to move together with the secondary valve body in the axial direction of the valve shaft in order to close or open the nozzle; and
   resilient means adapted to press the secondary valve body adequately in the direction away from the nozzle when the main valve body is in a closed position.

2. The stop valve of claim 1, wherein the supporting part of the auxiliary valve includes a hollow cylindrical part which slides tightly on the part of the valve shaft.

3. The stop valve of claim 2, wherein the cylindrical part is provided on its external surface with ribs for maintaining the main valve in position.

4. The stop valve of claim 1, wherein the resilient means is secured in the fluid passage by means of an engaging block which opposes the secondary valve body and is provided with at least one projecting portion by which the engaging block is easily engaged with a member set in the fluid passage by sliding along the member.

5. The stop valve of claim 4, wherein the projecting portion is slidably receivable in a recess formed in the member set in the fluid passage.

6. The stop valve of claim 1, wherein the stop valve further includes means for detaching the main valve body from the secondary valve body in order to keep the central aperture of the main valve open while the valve is opened.

7. The stop valve of claim 1 or 4, wherein the valve shaft is easily attachable to the solenoid by inserting the shaft into a tube of the solenoid until an end of the shaft comes into contact with an end of a movable steel core of the solenoid.

* * * * *